(12) United States Patent
Popat

(10) Patent No.: US 6,618,780 B1
(45) Date of Patent: Sep. 9, 2003

(54) METHOD AND APPARATUS FOR CONTROLLING INTERRUPT PRIORITY RESOLUTION

(75) Inventor: Kaushik L. Popat, Pleasanton, CA (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/470,763

(22) Filed: Dec. 23, 1999

(51) Int. Cl.$^7$ ............................. G06F 3/00; G06F 9/48
(52) U.S. Cl. ..................... 710/264; 710/262; 710/266
(58) Field of Search .................. 710/260–265, 710/269, 112, 240, 244, 48, 51

(56) References Cited

U.S. PATENT DOCUMENTS

| | | | |
|---|---|---|---|
| 3,665,415 A | * | 5/1972 | Beard et al. |
| 3,925,766 A | * | 12/1975 | Bardotti et al. |
| 4,417,302 A | * | 11/1983 | Chimienti et al. |
| 4,609,995 A | * | 9/1986 | Hasebe |
| 4,914,580 A | * | 4/1990 | Jensen et al. |
| 4,953,081 A | * | 8/1990 | Feal et al. |
| 5,892,957 A | * | 4/1999 | Normoyle et al. |
| 5,905,898 A | * | 5/1999 | Qureshi et al. |

* cited by examiner

Primary Examiner—Gopal C. Ray

(57) ABSTRACT

A method and apparatus are described which allow for greater control of interrupt generation to a processor or the like. In one embodiment, a priority selection device is provided which allows a processor or other devices to set the relative priorities among different interrupt requests. The priority information may be dynamic in that it can be modified at other times (e.g., based on the needs of the computer system). A priority resolution device and mask logic device determine which of the generated interrupt requests is of the highest priority and generates an interrupt to the processor to service that high-priority interrupt. In one embodiment, when a processor is servicing an interrupt and a higher priority interrupt is generated, the processor nests the servicing of the higher-priority interrupt in the servicing of the current interrupt. If the newly asserted interrupt request has a priority that is less than the priority of the currently serviced interrupt, the lower-priority interrupt is prevented from being asserted to the processor (until at least the servicing of the higher-priority interrupt is complete, for example).

13 Claims, 5 Drawing Sheets

METHOD AND APPARATUS FOR CONTROLLING INTERRUPT PRIORITY RESOLUTION

BACKGROUND OF THE INVENTION

The present invention pertains to a method and apparatus for controlling interrupt priority resolution in a computer system or the like. More particularly, the present invention pertains to a method and system to dynamically control the determination of interrupt priority.

In a computer system or the like, a processor or other similar computing device may receive one or more interrupt requests generated internally or from peripheral devices coupled to the processor. When an interrupt is received by a processor, it typically suspends the processing that is currently being performed, stores the values currently loaded in its registers and begins execution of code to respond to the interrupt request.

As computer systems become more complex, more and more devices are given the opportunity to generate interrupt requests to the processor. Sometimes, interrupt requests may be received simultaneously by the processor. In other situations an interrupt request may be received while another interrupt request is being handled. This poses a problem for the designer in that processing of some interrupts may be so critical to the computer system that the servicing of inferior interrupt requests may negatively impact system operation.

One option for the computer system designer is to provide some sort of system that allows for one interrupt request to have priority over another. In such a device when two or more interrupts are received simultaneously, either the processor executing software code or, a logic device external to the processor (e.g., by looking to input pins that have a preassigned priority order), determines which of the interrupts has a higher priority and services the highest priority interrupt first. There are several drawbacks to such a system. First, the setting of the priority is static in that once the priority is set between two or more interrupts, that priority is maintained throughout the operation of the computer system. Second, when a computer system is handling a low priority interrupt, it will complete servicing of that interrupt before servicing higher-priority interrupts. If higher-priority interrupts (or those interrupts that later become a higher priority) are not handled quickly, there could be a negative impact on computer system performance. Finally, a software-based approach to resolving interrupt request priorities may take many instruction cycles and result in long latencies in servicing interrupts.

In view of the above, there is a need for a system and method that provides a quicker interrupt priority resolution and faster interrupt servicing in a computer system.

SUMMARY OF THE INVENTION

A method and apparatus are described which allow for greater control of interrupt generation to a processor or the like. In one embodiment, a priority selection device is provided which allows a processor or other devices to set the relative priorities among different interrupt requests. The priority information may be dynamic in that it can be modified at other times (e.g., based on the needs of the computer system). A priority resolution device and mask logic device determine which of the generated interrupt requests is of the highest priority and generates an interrupt to the processor to service that high-priority interrupt. In one embodiment, when a processor is servicing an interrupt and a higher priority interrupt is generated, the processor nests the servicing of the higher-priority interrupt in the servicing of the current interrupt. If the newly asserted interrupt request has a priority that is less than the priority of the currently serviced interrupt, the lower-priority interrupt is prevented from being asserted to the processor (until at least the servicing of the higher-priority interrupt is complete, for example).

DETAILED DESCRIPTION

Figure 1:
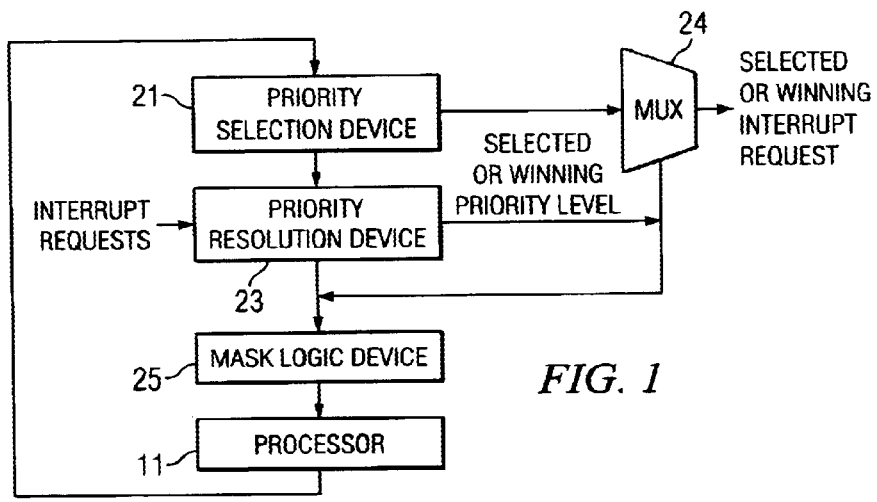
FIG. 1 is a block diagram of a computer system that uses an interrupt priority resolution according to an embodiment of the present invention.

Referring to FIG. 1, a computer system that uses an interrupt priority resolution of the present invention is shown. A processor 11 receives interrupt-requests (IRQs) from the interrupt priority resolution system as described below. A priority selection device 21 is provided, which allows the processor 11 or other devices to define the priority for interrupt requests being asserted to the processor 11. The priority selection device 21 is coupled to a priority resolution device 23 which receives the interrupt requests generated in the computer system. Based on the settings in the priority selection device 21, the priority resolution device 23 determines which interrupt request is to be serviced and its priority level. The selected priority level may be sent to a multiplexer (MUX) 24 that is used to output the selected interrupt requests (e.g., by number). The selected priority level may also be sent to a mask logic device 25 which receives an output from the priority resolution device 23 to generate the interrupt request to be serviced by processor 11.

Figure 2:
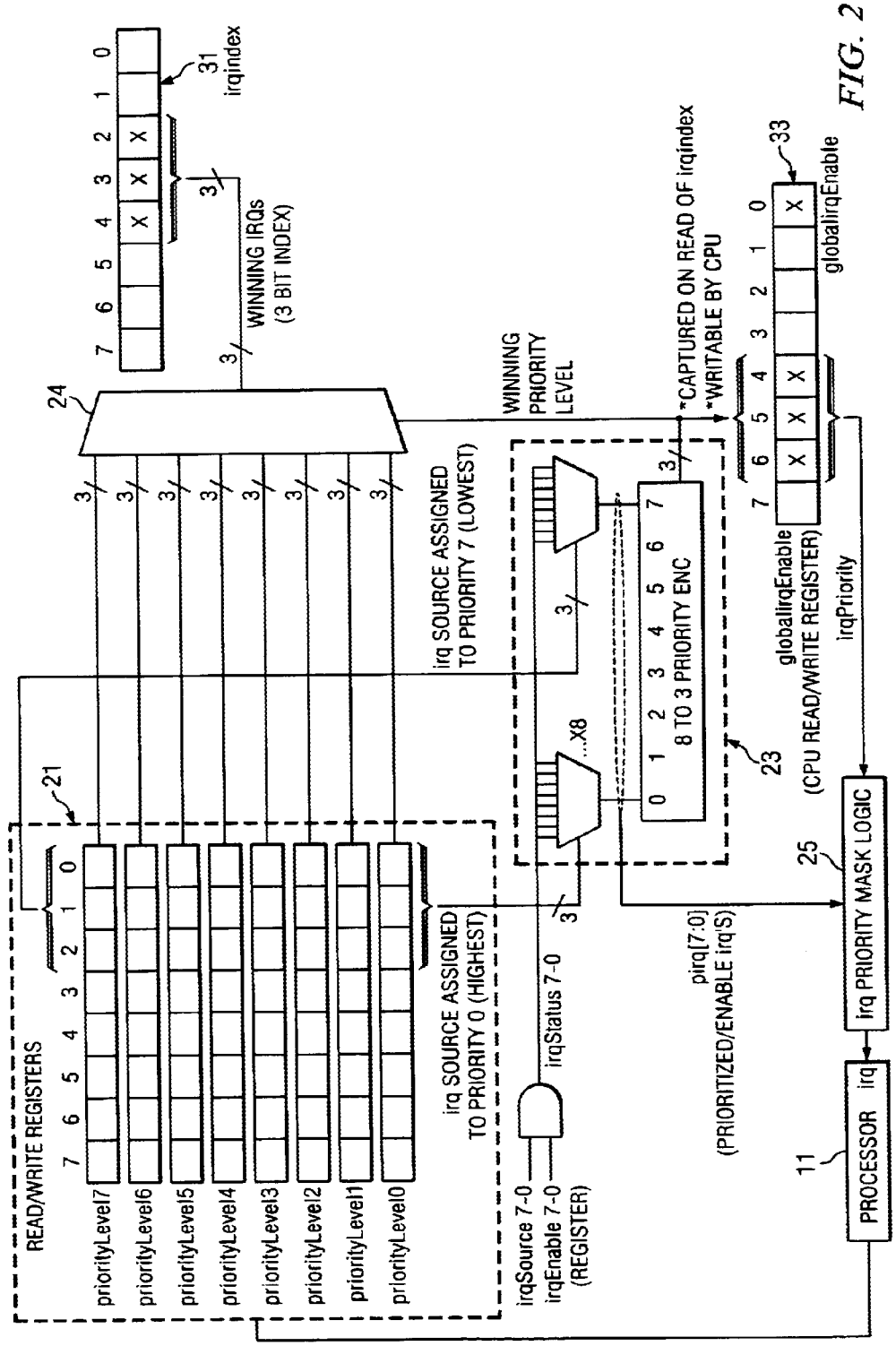
FIG. 2 is a more detailed block diagram of a computer system including an interrupt priority resolution system according to an embodiment of the present invention.

A more detailed embodiment of the interrupt priority resolution system of FIG. 1 is shown in FIG. 2. In this embodiment, the priority selection device 21 is implemented as a series of registers, one for each interrupt priority level in the computer system. As seen in FIG. 2, eight such registers are provided. One skilled in the art will appreciate that fewer registers or a different memory device may be provided to represent eight priority levels and more or fewer than eight levels may be provided depending on the computer system in question. In this embodiment, the last three bits of each register indicate the IRQ number that has been assigned a given priority level. For example, assuming that IRQ4 is given the highest priority level, then the last three bits for register "priorityLevel0" will be set to "100" (binary 4), and assuming that IRQ3 is given the lowest priority level, then the last three bits for register "priorityLevel7" will be set to "011" (binary 3).

The priority resolution device 23 can be implemented as a series of eight multiplexers coupled to an 8-to-3 encoder. The three-bit interrupt request numbers from each of the priority level registers are supplied as a select input to one of the multiplexers as shown in FIG. 2. The inputs to the multiplexers represent the status of the eight interrupt requests IRQ7–0. In this embodiment, the individual interrupts can be enabled/disabled by writing an appropriate eight-bit value into a specific register ("IrqEnable"). For example, bit 0 of this register can be ANDed with IRQ0 before being supplied to the priority resolution device 23. Thus, if bit 0 of the IrqEnable register is set to a binary "0", then IRQ0 will not be serviced by the processor 11 whether that interrupt request is generated or not.

The three bits from priorityLevel0 ("100" in this example) are supplied as the select input for the first multiplexer (also the highest priority). If IRQ4 is enabled and asserted, then the output of this first multiplexer will be asserted. Likewise, the three bits from priorityLevel7 ("011" in this example) are supplied as the select input for the eighth multiplexer (also the lowest priority). If IRQ3 is enabled and asserted, then the output of the eighth multiplexer will be asserted. The 8-to-3 priority encoder selects the highest priority level that is currently asserted ("winning priority level") and outputs this three-bit value to the select input of multiplexer 24. The three-bit IRQ values from the priority level registers supply the inputs to this multiplexer, which outputs the selected interrupt request. If desired, this value, which represents the current, highest-priority interrupt being asserted, may be stored in a memory device such as a register 31 ("IrqIndex").

The selected priority level is also provided to the mask logic device 25 (it may also be intermediately stored in a register 33 ("IrqPriority")). The mask logic device 25 receives the selected priority level and an array of the outputs of the eight multiplexers of the priority resolution device. Based on these inputs, the mask logic device 25 outputs the appropriate interrupt request to the processor 11. In one embodiment, the mask logic device generates an interrupt request when no interrupt service routine is being carried out by the processor 11 or when the current, highest-priority interrupt request is of a higher priority than the interrupt service routine being carried out by the processor 11. As stated previously, the processor 11 (or other devices as available) may modify the values to the priority level registers to initialize or change the priority levels for the interrupts generated in the computer system. Also, the registers referenced above may also be read by the processor and used in making decisions in interrupt servicing operations. Accordingly, when the processor is turning to servicing a new interrupt request, the register IrqIndex would indicate the interrupt request number. This allows processor 11, executing software code, to branch directly to the appropriate IRQ Service Routine (ISR) using a vector table as is known in the art. Many software steps are saved that would otherwise have been taken to determine which IRQ to service.

As stated above, it may be desirable to only interrupt the servicing of an interrupt request if a higher priority interrupt is generated. Since the higher priority interrupt request would be serviced in the middle of servicing the lower priority interrupt, this may be referred to as interrupt nesting. The system described above may provide for selective nesting of interrupts by masking out interrupts that are of a lower priority than the one currently being serviced.

As interrupts are generated to the priority resolution device 23 (FIG. 1), the system of FIGS. 1 and 2 may continuously determine which asserted interrupt request has the highest priority. This value is stored in the IrqPriority register (FIG. 2). The irqPriority field of this register is captured by the hardware of FIG. 2 when the processor 11, under the execution of software code, reads the value from the IrqIndex register 31. Once that priority is captured, the mask logic device 25 then works to mask out those interrupt requests that have a priority lower than the one currently being serviced. Since the processor 11 may write to the register described in FIG. 2, it may write to the IrqPriority register to set the priority back down to that for the interrupt requests currently being serviced once the service of the higher-priority interrupt is completed.

As described above, the processor 11 is capable of utilizing the mask logic device 25 and registers 31, 33 to service interrupts according to their priority. If desired, the processor 11 (executing software code) may disable the mask logic device 25 so as to receive all interrupts and select which interrupts to process based on the values in registers 31, 33 or under some other criteria.

Figure 3A:
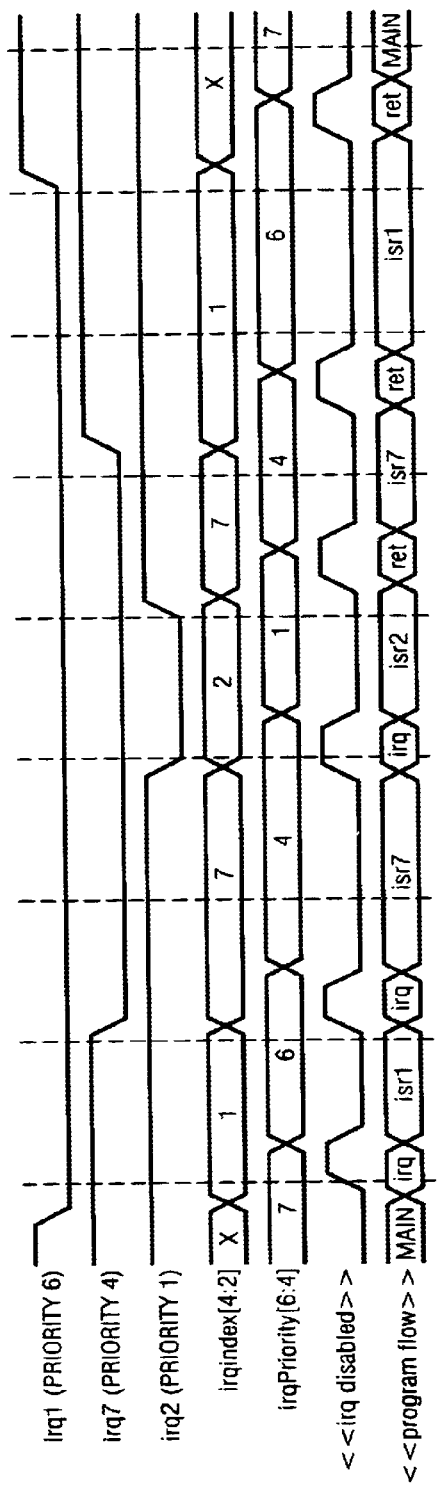
FIGS. 3a and 3b are timing diagrams explaining the servicing of interrupt requests according to an embodiment of the present invention.

Referring to FIG. 3a, a timing diagram showing the relationship between the execution of nested interrupt service routines is shown. Initially, the irqPriority is set to its lowest value (in this embodiment, 7 is the lowest priority and 0 is the highest priority) and the processor 11 is executing main (i.e., non ISR) source code. In the example shown in FIG. 3a, IRQ1 is asserted having a relatively low priority of 6. The IrqIndex (register 31 in FIG. 2) reflects this interrupt request as the winning IRQ. When the processor 11 reads the IrqIndex register, the priority level for IRQ1 is stored in the IrqPriority register (register 33 in FIG. 2) and an interrupt request is generated to the processor 11 (all other interrupt requests are disabled while the processor 11 stores the registers currently being used while executing main source code (e.g., PUSHing these values onto the stack as is known in the art)). Afterwards, the processor then performs the ISR for IRQ1.

At some later time, IRQ7 is asserted which has a priority of 4 in this embodiment. Since the priority of IRQ7 is higher than that for IRQ 1, the IrqIndex value changes to "7," the irqPriority value changes to 4, and a new interrupt request is generated to the processor 11. Again, all other interrupt requests to the processor 11 are disabled while the processor 11 stores the registers that are being used during the ISR for IRQ1 (the values in registers 31 and 33 may also be stored). As seen in FIG. 3a, the processor 11 will then continue with the processing of the ISR for IRQ7. When IRQ2 is asserted having a priority of 1 (which is higher than the priority for IRQ7), the processor will once again store the register values for the ISR it is currently executing so as to execute the ISR for IRQ2.

When the execution of the ISR for IRQ2 is completed, the processor disables interrupt requests while it restores the register values to those for the ISR for IRQ7, which was interrupted by IRQ2, also the irqPriority value is updated by the processor to the priority value of IRQ7 (4 in this example). Interrupt requests are then enabled by the processor and execution for the ISR for IRQ7 continues. Assuming that no interrupt requests are generated having a higher priority than 4, execution of the ISR for IRQ7 will be completed and then the processor 11 will turn to completing execution of the ISR for IRQ1. Once execution of all ISRs for pending IRQs is completed, the processor 11 then turns back to executing the main source code. Throughout the process indicated above, when an interrupt is generated having a higher priority than that which is currently being serviced, the processor will receive the interrupt request and will turn immediately to execution of the appropriate ISR. Because the register values can be stored in system memory when nesting the processing of one interrupt during the processing of a previous interrupt, virtually unlimited nesting can be achieved. This is because the information needed to restore processing of the previous interrupts may be stored in system memory rather than in on-chip registers or memory that may be limited in size.

Figure 3B:
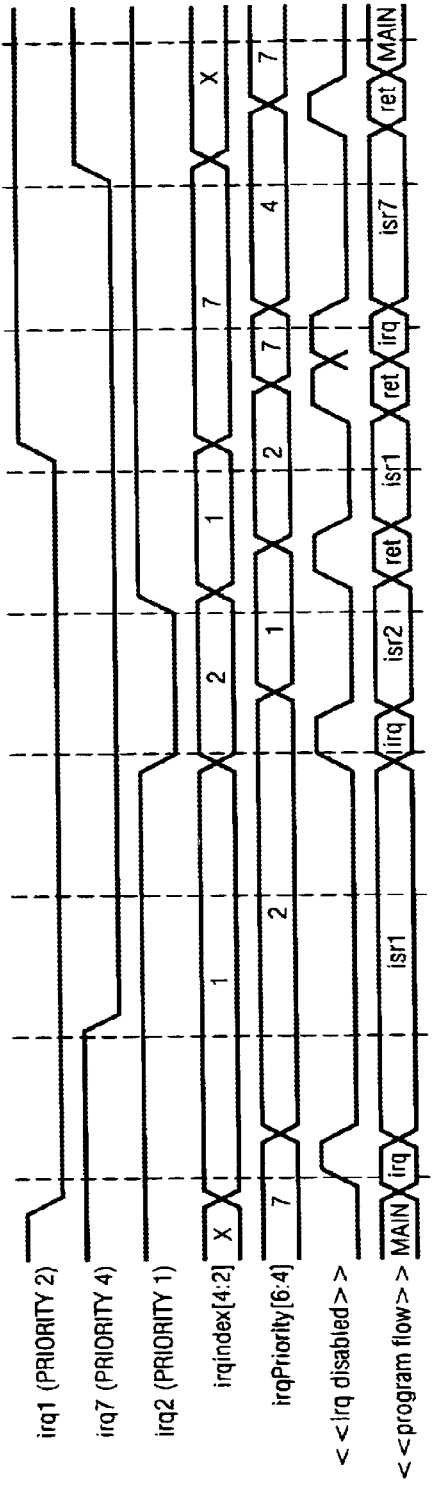

Referring to FIG. 3b, a second example is shown where an interrupt request having a priority lower than the one currently being serviced is generated. As seen in FIG. 3b, while the processor is servicing IRQ1, which has a priority of 2 in this example, IRQ7 is asserted having a lower priority of 4. Referring back to FIG. 2, the mask logic device 25 sees that the irqPriority value is set to 2. Since the newly asserted IRQ7 interrupt has a lower priority than 2, the mask logic device 25 masks this interrupt request and does not generate an interrupt to the processor 11. When an interrupt having a higher priority than 2 (e.g., IRQ2 which has a priority of 1 in this example), the mask logic device will generate an interrupt request to the processor and the winning priority level at irqPriority will be 1 when read by the processor. After completion of servicing IRQ1 and IRQ2, IRQ7 will then be the only pending interrupt request, and thus, the highest priority pending interrupt request. As seen in FIG. 3b, once IRQ1 and IRQ2 are cleared, the processor sets the irqPriority to its lowest level (7 in this example), and then the mask logic device 25 (FIG. 2) may immediately generate an interrupt request to the processor 11 to commence servicing of IRQ7.

Figure 4A:
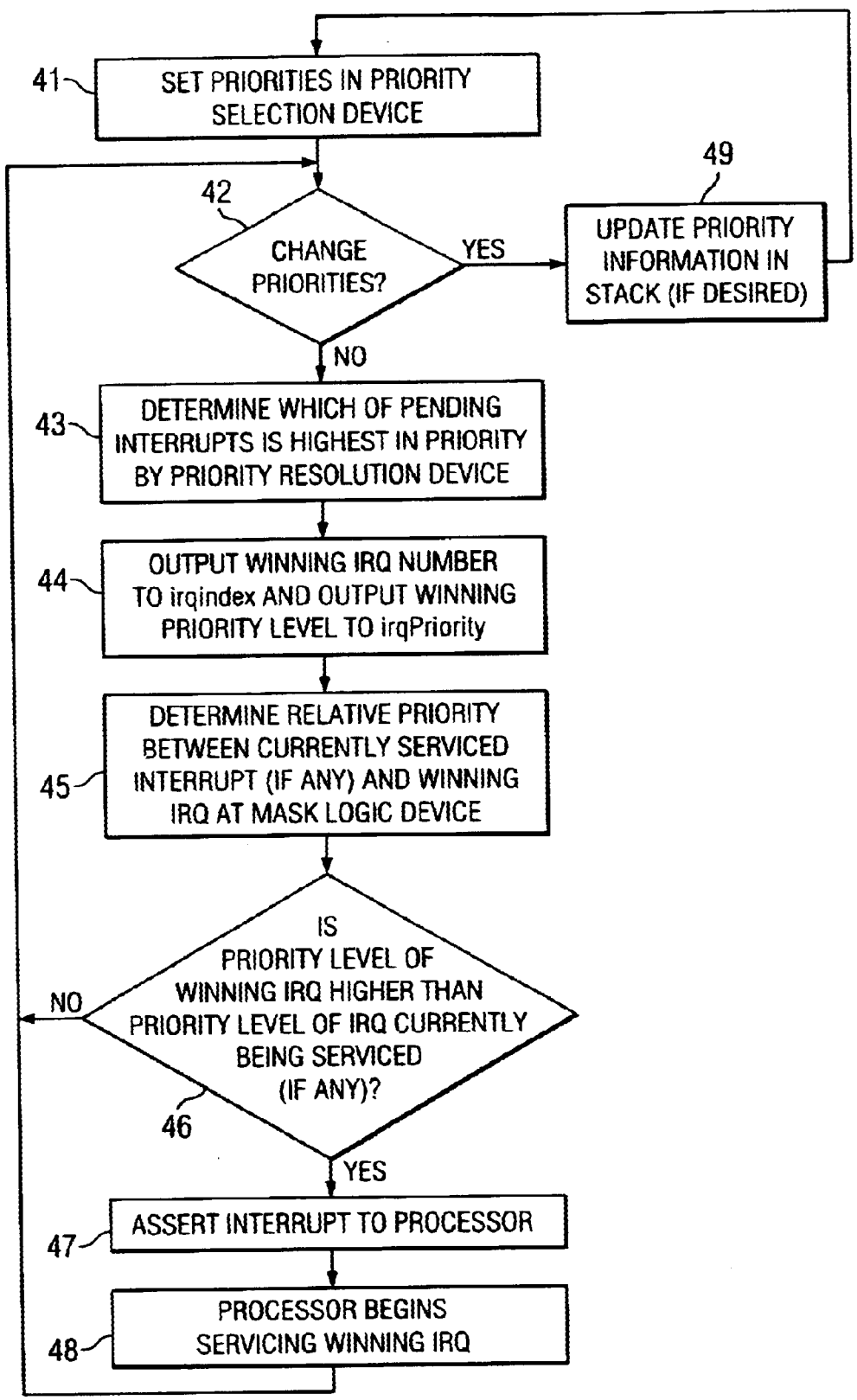
FIGS. 4a and 4b are flow diagrams of methods performed according to embodiments of the present invention.
Figure 4B:
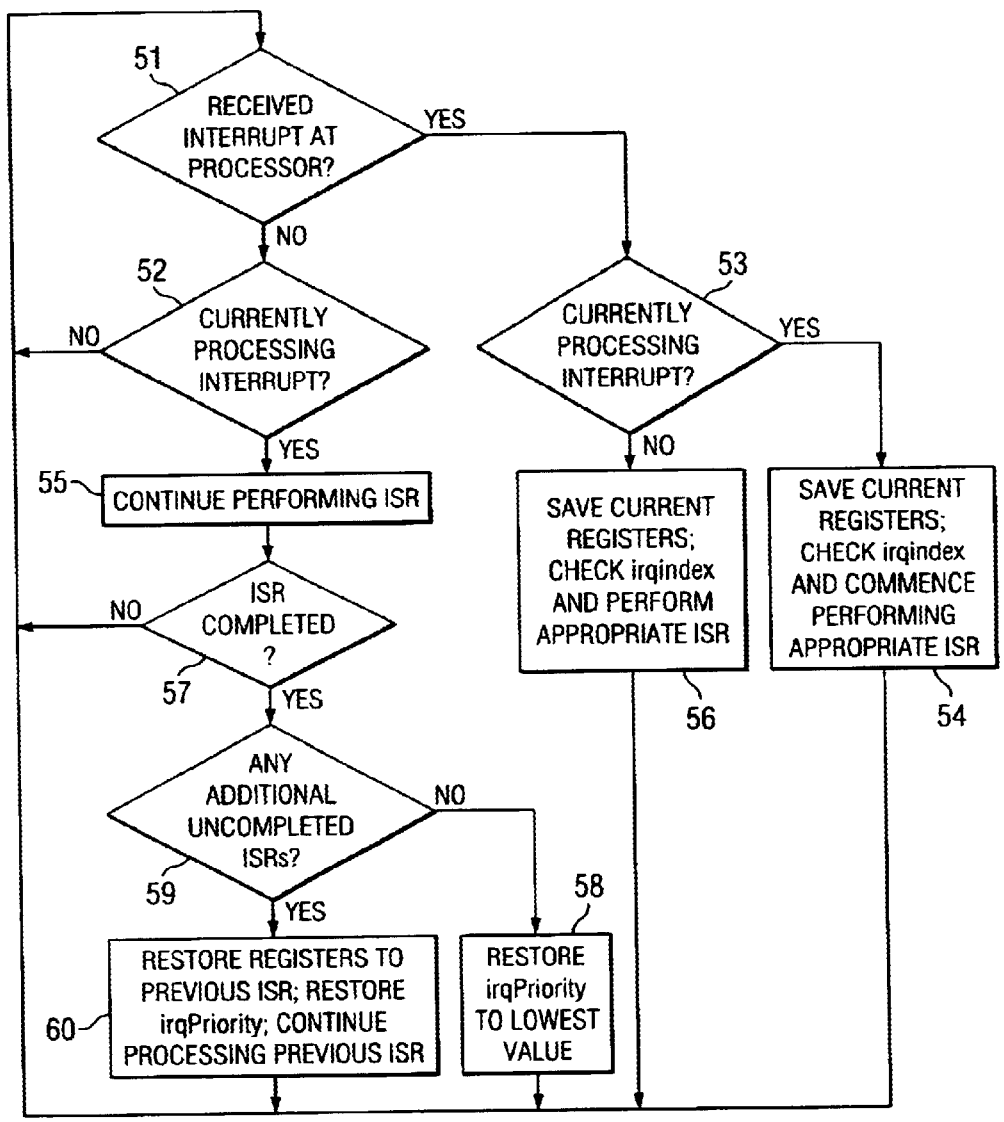

Flowcharts describing embodiments of methods according to the present invention are shown in FIGS. 4a–b. In FIG. 4a, the relative priorities between interrupt requests are set in the Priority Selection Device in block 41 at a first time. In decision block 42, if the priorities are to be changed (i.e., at a second time), control passes pack to block 41 to change the priorities (e.g., under control of the processor). One skilled in the art will appreciate that the priorities in the Priority Selection Device may be changed at other times and at other points during the method of the present invention. For example, the processor 11 (under operation of software code) may temporarily change the prioritization of interrupts by first saving the current priority information (as in block 49) and then resetting the interrupt priorities so that the original priority information may be restored. In block 43, it is determined which of the pending interrupt requests is highest in priority by the Priority Resolution Device. In block 44, the winning IRQ is output to the IrqIndex register and the winning priority level is output to the IrqPriority register. In block 45, the relative priority between the currently serviced interrupt and the winning IRQ is determined at the Mask Logic Device. In decision block 46, if the priority level of the winning IRQ is higher than the priority level of the IRQ currently being serviced, then control pass to blocks 47 and 48 where an interrupt is asserted to the processor and the processor begins servicing the winning IRQ.

Referring to FIG. 4b, an example is shown of a method for processing interrupts by the processor according to an embodiment of the present invention. When the processor receives an interrupt (decision block 51) control passes to decision block 53 to determine if the processor is currently processing another interrupt. If so, control passes to block 54 where the current registers for servicing the current IRQ are saved, the IrqIndex is checked for the next IRQ to be service and the appropriate ISR is started. If the processor is not currently processing an IRQ, the IrqIndex is checked for the IRQ number, and the appropriate ISR is started (block 56). When the processor is currently servicing an interrupt (decision block 52), control passes to block 55 to continue that process. When the ISR is completed (decision block 57), control passes to decision block 59 to determine if there are any uncompleted ISR's (i.e., ISRs that were interrupted due to receipt of a higher-priority interrupt). If there are uncompleted ISR's, then the registers in the processor are reset with the values that were present before the last interrupt was received. Also, the IrqPriority register is reset to the appropriate value for the IRQ now being serviced (block 60). If there are no additional uncompleted ISRs, control passes to block 58 where the IrqPriority register is reset to its lowest value and the processor continues with processing main source code.

Figure 5:
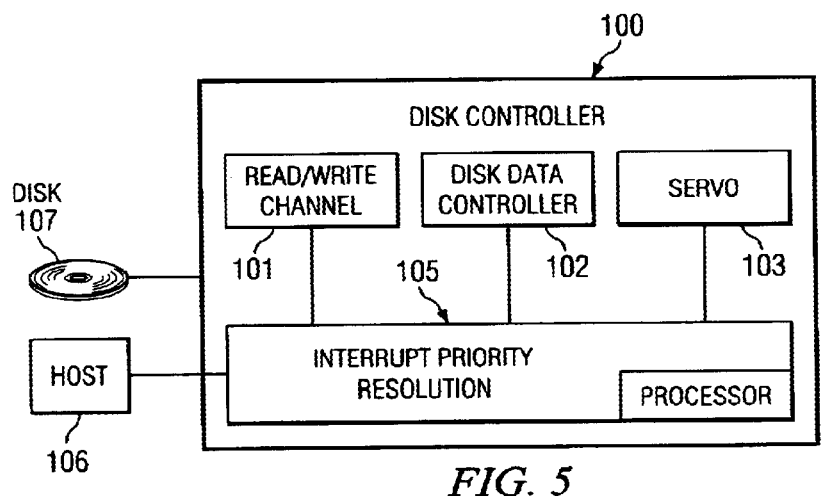
FIG. 5 is a block diagram of a disk controller that includes an interrupt priority resolution device according to an embodiment of the present invention.

According to an embodiment of the present invention, the apparatus for controlling interrupt priority resolution described above may be implemented in a hard-disk drive controller. A simplified disk controller including the apparatus of the present invention is shown in FIG. 5. As known in the art, a disk controller is typically coupled to a host 106 (e.g., a personal computer) and a magnetic recording disk 107. The disk controller 100 includes a plurality of components such as error correction code (ECC) logic (e.g., in a Disk Data Controller 102), read/write channel logic 101, servo controller 103, etc. Many of these devices and others are adapted to generate interrupts to the processor of the disk controller. According to an embodiment of the present invention, the interrupt priority resolution device 105 is adapted to set-up prioritization between these generated interrupts. For example, interrupts from the servo controller 103 may be given a high priority so that servo information will not be missed as the magnetic head passes over servo areas of the disk 107. Likewise, interrupts from the host may be given a lower priority assuming that response to such interrupts is not time critical.

Although embodiments are specifically illustrated and described herein, it will be appreciated that modifications and variations of the present invention are covered by the above teachings and within the purview of the appended claims without departing from the spirit and intended scope of the invention.

What is claimed is:

1. A computer system comprising:

a plurality of interrupt sources;

a processor operable for servicing interrupt requests generated by the interrupt sources;

a priority selection device for storage of a plurality of available IRQ source numbers according to assigned priority levels, comprising a first plurality of sequentially ordered priority level registers, each representing an IRQ priority level and storing an IRQ source number assigned to the IRQ priority level; and a priority resolution device coupled to said processor and said priority selection device, said priority resolution device comprising:

a plurality of sequentially ordered first multiplexers, each comprising:

a plurality of inputs, each coupled to receive a signal representing a status of an IRQ;

a select input coupled to receive the IRQ source number stored in a corresponding one of the priority level registers; and an output representing the status of the IRQ assigned to the corresponding one of the priority level registers; and an encoder, comprising:

a plurality of inputs, each coupled to receive the output from one of the plurality of multiplexers; and an output representing the level of a selected IRQ having the highest priority level of IRQs with an active status.

2. The computer system of claim 1 wherein said processor is adapted to override said priority resolution device and service generated interrupt request different from the generated interrupt request having the highest priority.

3. The computer system of claim 1 wherein said priority resolution device is to determine whether an additional generated interrupt request has a higher priority than the interrupt request currently being serviced by said processor and transmit a signal to said processor if the additional interrupt request has a higher priority than the interrupt request currently being serviced by said processor.

4. The computer system of claim 1 wherein said priority resolution device is adapted to determine whether an additional generated interrupt request has a higher priority than the interrupt request currently being serviced by said processor and transmit a signal to said processor to prevent said processor from servicing the additional interrupt request if the additional interrupt request has a lower priority than the interrupt request currently being serviced by said processor.

5. A priority interrupt resolution system for a computing system, comprising:
   a priority selection device, comprising:
      a first plurality of sequentially ordered priority level registers, each representing an IRQ priority level and storing an IRQ source number assigned to the IRQ priority level;
   a priority resolution device, comprising:
      a plurality of sequentially ordered first multiplexers, each comprising:
         a plurality of inputs, each coupled to receive a signal representing a status of an IRQ;
         a select input coupled to receive the IRQ source number stored in a corresponding one of the priority level registers; and
         an output representing the status of the IRQ assigned to the corresponding one of the priority level registers; and
      an encoder, comprising:
         a plurality of inputs, each coupled to receive the output from one of the plurality of multiplexers; and
         an output representing the level of a selected IRQ having the highest priority level of IRQs with an active status; and
      a second multiplexer, comprising:
         a plurality of inputs, each coupled to receive the IRQ source number stored in a corresponding one of the priority level registers;
         a select input coupled to receive the output of the encoder; and
         an output representing the IRQ source number of the selected IRQ;
   whereby a processor may execute an interrupt service routine of the selected IRQ.

6. The system of claim 5, further comprising:
   an IndexRegister coupled to store the output of the second multiplexer; and
   a PriorityRegister coupled to store the output of the encoder.

7. The system of claim 5, further comprising mask logic comprising:
   a first input coupled to receive the output of the encoder;
   a plurality of second inputs, each coupled to receive the output of one of the first multiplexers; and
   an output for transmitting to a processor an IRQ to be serviced.

8. The system of claim 7, the priority selection device further comprising an input coupled to receive instructions from the processor to change the IRQ source number assigned to at least one IRQ priority level.

9. A method for controlling interrupt priority in a computer system, comprising:
   storing in each of a plurality of sequentially ordered memory locations an IRQ number of an IRQ source, each memory location representing an IRQ priority level;
   receiving an IRQ from at least one of the IRQ sources;
   determining a status of each IRQ source;
   receiving in an encoder a first plurality of signals, each representing the status of an IRQ source;
   outputting from the encoder a second signal representing the priority level of a first selected IRQ having the highest priority level of IRQs with an active status; and
   processing the first selected IRQ.

10. The method of claim 9, further comprising:
   re-determining the status of each IRQ source while the first selected IRQ is being processed;
   receiving in the encoder a third plurality of signals, each representing the status of an IRQ source;
   outputting from the encoder a fourth signal representing the priority level of a second selected IRQ having the then highest priority level of IRQs with an active status;
   if the second selected priority level is greater than the first selected priority level, processing the second selected IRQ; and
   if the second selected priority level is less than the first selected priority level, continuing to process the first selected IRQ.

11. The method of claim 9, further comprising: masking IRQ's having priority levels less than the level of the IRQ with the first selected priority level.

12. The method of claim 9, further comprising:
   storing the number of the first selected IRQ in a first memory location; and
   storing the priority level of the first selected IRQ in a second memory location.

13. The method of claim 9, further comprising modifying the IRQ number of an IRQ source in at least one of the memory locations.

* * * * *